(12) United States Patent
Emery

(10) Patent No.: US 7,516,535 B1
(45) Date of Patent: Apr. 14, 2009

(54) SYSTEM AND METHOD FOR SECURING A ROTOR TO A MOTOR DRIVE SHAFT USING A PRESSURE CLAMP

(75) Inventor: John W. Emery, North Royalton, OH (US)

(73) Assignee: Avtron Industrial Automation, Inc., Independence, OH (US)

( * ) Notice: Subject to any disclaimer, the term of this patent is extended or adjusted under 35 U.S.C. 154(b) by 552 days.

(21) Appl. No.: 11/204,894

(22) Filed: Aug. 16, 2005

(51) Int. Cl.
*B23P 11/00* (2006.01)
*F16J 15/34* (2006.01)

(52) U.S. Cl. .................................. 29/525.01; 277/369

(58) Field of Classification Search .............. 29/525.01, 29/525.02, 428, 238; 277/369, 370, 390, 277/348, 398
See application file for complete search history.

(56) References Cited

U.S. PATENT DOCUMENTS 6,485,023 B2 * 11/2002 Budrow et al. .............. 277/370

* cited by examiner

*Primary Examiner*—John C Hong
(74) *Attorney, Agent, or Firm*—Thompson Hine LLP

(57) ABSTRACT

A rotor assembly for mounting a rotor to a motor shaft having a rotor with a main aperture defined by a first half and a second half. A C-shaped collar is disposed into the second half of the main aperture with the motor shaft passing through the first half of the main aperture and the interior curve of the collar. The collar is secured to the rotor by a plurality of fasteners.

17 Claims, 4 Drawing Sheets

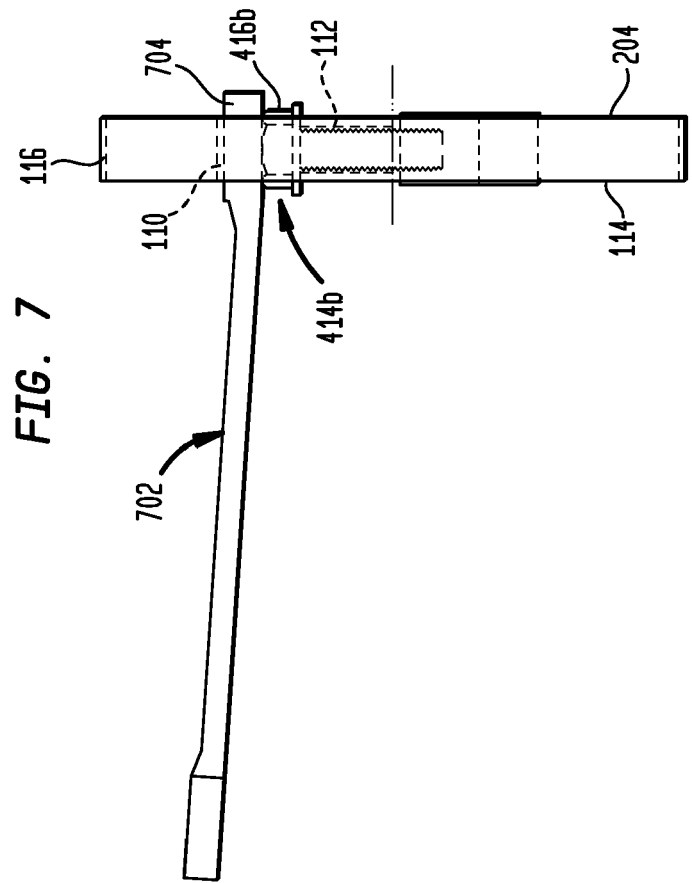
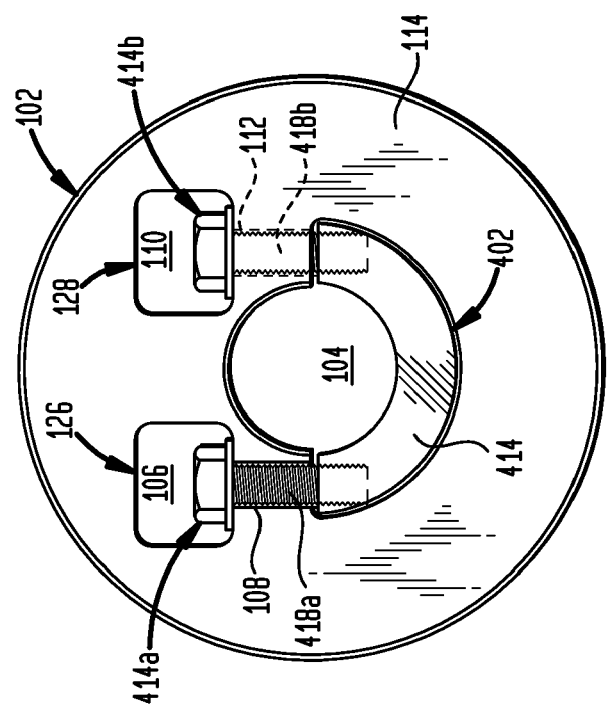
FIG. 7
FIG. 6

SYSTEM AND METHOD FOR SECURING A ROTOR TO A MOTOR DRIVE SHAFT USING A PRESSURE CLAMP

BACKGROUND OF THE INVENTION

1. Technical Field

The present invention relates to rotors, and in particular, to a magnetic encoded rotor incorporating a means for securing the rotor to a motor drive shaft, the means incorporating a pressure clamp.

2. Related Art

There are various systems and methods for mounting modular magnetic encoder rotors to a motor drive shaft (or motor shaft). However, there are disadvantages with each of these current systems.

A first system is directed to a rotor having an external hub encircling and extending away from the central aperture. The external hub typically has a diameter less than the outer diameter of the rotor and extends from the face of the hub a relatively short distance. A plurality of set screws are inserted through holes in the hub to engage the motor shaft. Upon tightening, the set screws secure the rotor to the motor shaft. In this embodiment, the external hub is typically positioned external to a stator housing, allowing the rotor to be repositioned after the stator housing is fixed in place. However, a known advantage of a modular encoder is having a thin axial profile, which is defeated by having an external hub. An external hub on a rotor adds thickness to the overall rotor, thereby negating the principal advantage of the modular encoder.

The second method is similar to the first system wherein set screws are used to secure a rotor to the motor shaft. In this embodiment, the set screws are positioned within the working thickness of the rotor such that they engage and tighten against the motor shaft through holes extending from the side edge of the rotor through the rotor's entire thickness. This is possible because of the two tracks normally on the rotor, one of the tracks is typically a "marker" track which utilizes a small portion of the rotor's circumference so that the rest of the circumference on that side is available to locate the set screws. This allows the rotor to maintain its thin axial profile. However, there are several disadvantages with this rotor design. First, because the magnetic encoder rotor is located inside the stator housing, the side edge of the rotor is inaccessible after mounting the stator housing. A rotor cannot be repositioned, repaired, or replaced without removing the stator housing. The stator housing must be removed to adjust the axial position of the rotor on the motor shaft. Second, it is more difficult to reliably achieve maximum clamping force with set screw tightening tools.

The third method is a rotor that is mostly hollow, having an internal hub with integral spokes connecting the internal hub with the outer edge of the rotor. Typically two or three spokes connect the outer diameter to the inner diameter wherein the inner diameter matches the diameter of the motor shaft. One of the spokes has a slot in the center, which extends down through the inner diameter hub. This slot provides the extra space needed to fit the rotor on the motor shaft. A screw passes through the spoke with the slot such that upon tightening the screw pinches the two halves of the slotted spoke together. This pinching action constricts the internal hub, tightening the rotor to the motor shaft. This system also has disadvantages. For example, it is more expensive to manufacture than using simple set screws. Further, the clamping forces are inferior to those of set screw methods. Lastly, the size of motor shaft diameters that can be accommodated are limited by the fact that the space between the slotted spoke and an adjacent spoke must be wide enough for a wrench or other tightening tool to fit.

A fourth method for mounting a rotor to a motor shaft is a rotor having a tapered hub and is divided into two halves. This system then uses a split ring to tighten the hub around a motor shaft. A first, or female, half of the rotor has an inner diameter matching the motor shaft with one side having a tapered groove to the hub defining the inner diameter. A second, or male, half of the rotor is machined with a groove having a taper inverse of the first half. The split ring is contained within the tapered groove of this second half. Then, as the two halves are bolted together with screws, the split ring contained within the halves constricts, thereby tightening the hub of the rotor around the motor shaft. As with other designs, this system for mounting rotor on a motor shaft is more expensive than a set screw system. Also, in the best case, this system has a clamping force comparable to set screw systems. However, this system is subject to assembly errors. If the clamping screws are not tightened uniformly (or if the screw over the split in the split ring) is tightened first, the clamping force is severely limited. There may be no immediate external indication of improper clamping, but such an improperly clamped rotor will slip during normal operation and cause system failures.

Therefore, there is a need for a simplistic system and method for securely mounting a rotor on a motor shaft. There is a further need for such a mounting system to provide easy and quick access to the fastening screws, or other fastening means, thereby minimizing maintenance time. There is still a further need for a mounting system for a rotor in which the rotor retains a thin profile while maintaining maximum clamping force on the motor shaft.

SUMMARY OF THE INVENTION

The present invention solves the problems associated with traditional mounting techniques by using a collar to mount a rotor to a motor shaft. The present rotor assembly has a rotor that is a circular disk having a main aperture defined by a first half and a second half. The first half is generally a half circle having a diameter about equal to the diameter of the target motor shaft. The second half also is generally a half circle but it has a diameter that is larger than the diameter of the first half and that accommodates the size of a collar. The rotor also has a two side apertures, each having a top portion and a bottom portion wherein the top portion is wider than the bottom portion and the bottom portion intersects with and is open to the second half of the main aperture. In addition, each top portion of a side aperture passes through the thickness of the rotor whereas each bottom portion passes only part way into the thickness of the rotor. Also, each bottom portion of the side apertures open from opposite sides, or faces, of the rotor.

The rotor assembly also has a collar and a plurality of fasteners for securing the collar to the rotor. The collar is an elongated bar having a generally C-shape with an interior half circle with a diameter about equal to the diameter of the motor shaft and an exterior half circle with a diameter less then the diameter of the second half of the main aperture previously described. The collar, which is disposed within the second half of the main aperture, is fastened to the rotor by conventional bolts disposed in the side apertures and threaded into the edges of the collar.

There are several advantages to the pressure clamp system and method. The principal advantage is (1) that the use of a pressure clamp achieves clamping forces to a motor shaft equal to those found in traditional set screw methods, greater then those of the spoke style, and more consistent and less prone to failure than the split ring with tapered hub method. Other advantages include: (2) the rotor maintains a narrow profile since the present invention does not require any protrusions or components extending out from the rotor; (3) the fasteners used with the pressure clamp are accessible through the faces of the rotor even after the stator housing is mounted on the motor shaft, (4) for a given rotor outer diameter, larger shaft sizes can be accommodated then those using the slotted spoke option, this is partly allowed by the use of hex bolts rather than the traditional Allen head cap screws; and (5) flat and lock washers can be used with these fasteners, which are less susceptible to improper installation by the end user than chemical fasteners typically used with set screw systems and methods.

DESCRIPTION OF THE FIGURES

The present invention is described with reference to the accompanying drawings. In the drawings, like reference numbers indicate identical or functionally similar elements. Additionally, the left-most digit(s) of a reference number identifies the drawings in which the reference number first appears.

FIG. 6 is a planar front view of the assembled rotor assembly showing internal details;

FIG. 7 is a planar cross-sectional side view of the assembly of the rotor assembly.

DETAILED DESCRIPTION OF THE PREFERRED EMBODIMENTS

Figure 2:
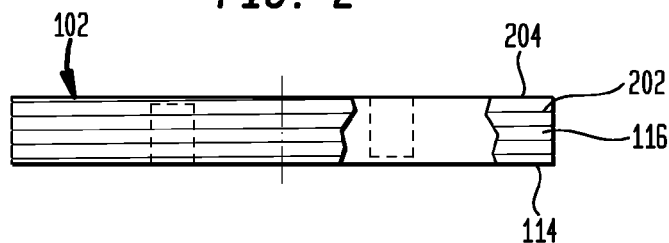
FIG. 2 is a planar top view of the rotor.
Figure 1:
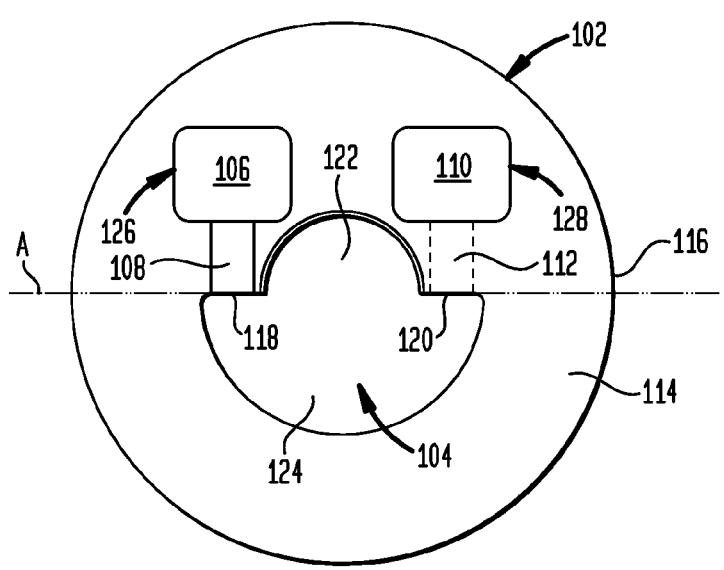
FIG. 1 is a planar front view of a rotor of the present invention.
Figure 3:
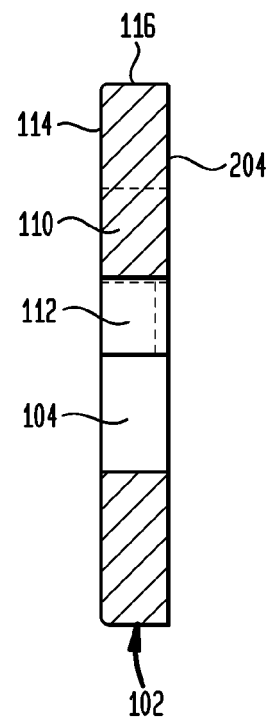
FIG. 3 is a planar cross-sectional side view of the rotor.
Figure 4:
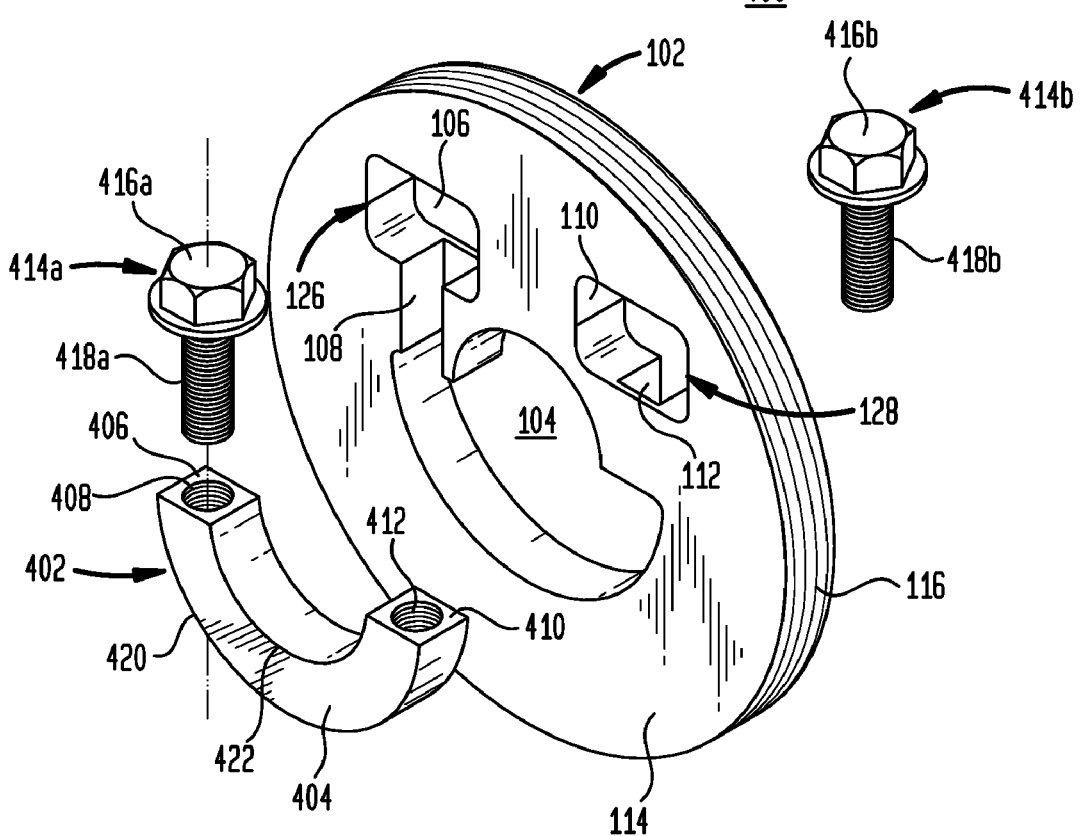
FIG. 4 is a perspective, exploded view of a rotor assembly of the present invention.
Figure 5:
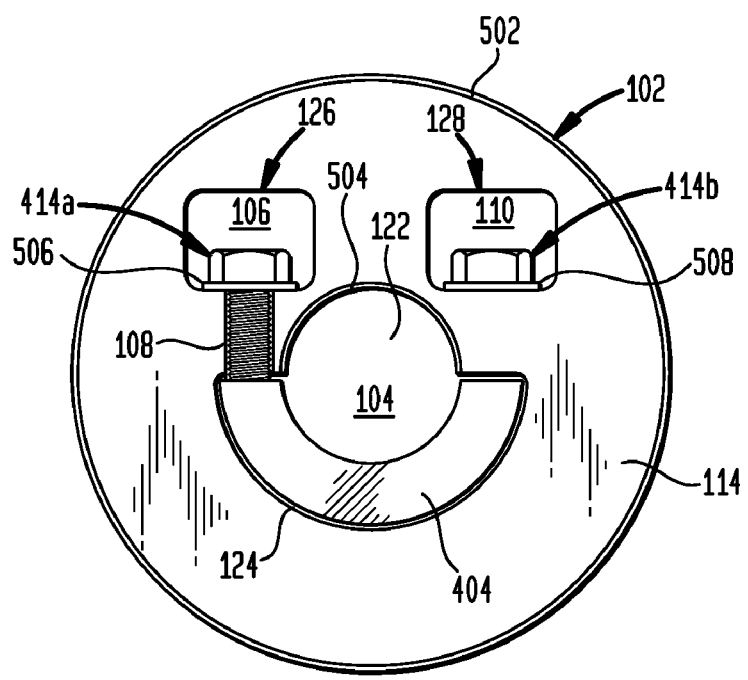
FIG. 5 is a planar front view of the assembled rotor assembly.
Figure 8:
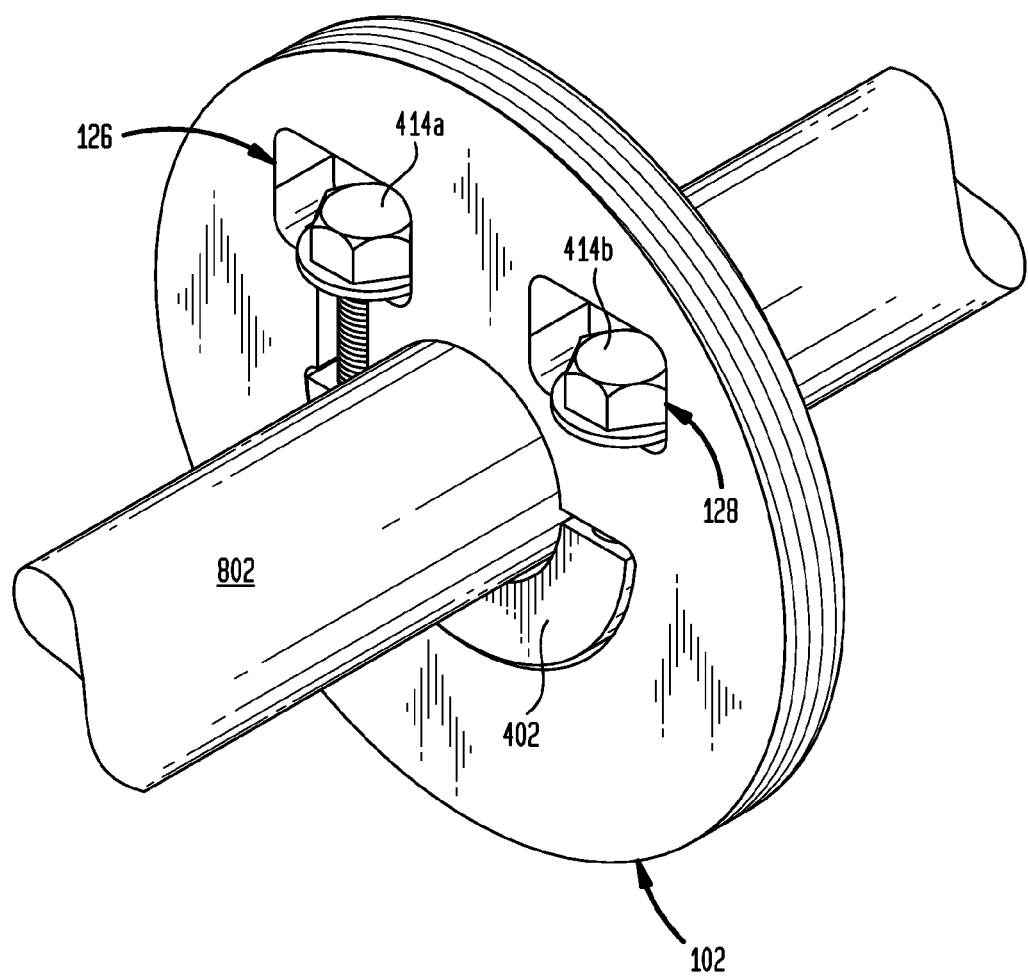
FIG. 8 is a perspective view of a rotor assembly mounted on a rotor shaft.

The rotor assembly of the present invention is shown in the accompanying figures. FIGS. 1-3 show the preferred embodiment of a rotor 102 having a first face 114, a second face 204, an external edge 116, and a main aperture 104 centrally positioned in the rotor 102. The main aperture 104 passes through the entire thickness of the rotor 102 and has a first half 122 and a second half 124. For convenience purpose only, the rotor 102 is shown have a longitudinal axis A that passes through the center point of the rotor 102. Therefore, the first half 122 of the main aperture 104 is that portion of the main aperture 104 located above axis A whereas the second half 124 of the main aperture 104 is that portion of the main aperture 104 located below axis A. In the preferred embodiment, the first half 122 of the main aperture 104 is generally a half circle having a diameter of a first size that is about equal to the diameter of the target motor shaft. The second half 124 of the main aperture 104 also is generally a half circle but it has a diameter that is larger than the diameter of the first half 122. Therefore, the second half 124 is larger than the first half 122 by a predefined length as shown by the first extension 118 and the second extension 120. In addition, the second half 124 has a size and shape needed to accommodate and contain a collar described below.

The rotor 102 also has a first side aperture 126 having a first top portion 106 and a first bottom portion 108 wherein the first top portion 106 is wider than the first bottom portion 108, resulting in a T-shape. The size and shape of the first top portion 106 is such that a head portion of a fastener, such as a bolt, can be disposed therein, whereas the size and shape of the first bottom portion 108 is such that a shaft of a fastener, such as a bolt, can be disposed therein. Thus, the first side aperture 126 has a size and shape needed to contain any selected fastener. Also, the first bottom portion 108 of the first side aperture 126 intersects with, and is open to, the second half 124 of the main aperture 104. In particular the first bottom portion 108 opens into the second half 124 of the main aperture 104 via the first extension 118. Also, the first top portion 106 passes through the entire rotor 102 whereas the first bottom portion 108 does not pass through the entire rotor and is machined part way into the first face 114 of the rotor 102.

Similarly, the rotor 102 also has a second side aperture 128 having a second top portion 110 and a second bottom portion 112 wherein the second top portion 110 is wider than the second bottom portion 112. Also, the second bottom portion 112 of the second side aperture 128 intersects with, and is open to, the second half 124 of the main aperture 104. In particular the second bottom portion 112 opens into the second half 124 of the main aperture 104 via the second extension 120. Also, the second top portion 110 passes through the entire rotor 102 whereas the second bottom portion 112 does not pass through the entire rotor and is machined part way into the second face 204 of the rotor 102.

In one embodiment, the rotor 102 is made of aluminum being about 3.7 inches in diameter and about 0.441 inches thick. The main aperture 104 has a first halve 122 diameter of about 1.125 inches and a second half 124 diameter of about 2.0 inches, thereby creating a first extension 118 and a second extension 120 overlap of about 0.44 inches respectively. The first side aperture 126 is about 1.13 inches in length wherein the first top portion 106 is about 0.6 inches in length and about 0.8 inches in width and the first bottom portion 108 (in the first face 114 of the rotor 102) is about 0.53 inches in length, about 0.282 inches in width, and about 0.35 inches in depth (not passing through the thickness of the rotor 102 while being open to the second half 124 of the main aperture 104). In the preferred embodiment, the second side aperture 128 has the same dimensions as the first side aperture 126; however, the second bottom portion 112 of the second side aperture 128 is on the second face 204—the face of the rotor 102 that is opposite from the first bottom portion 108 of the first side aperture 126.

The rotor assembly 400 of the present invention is shown in detail in FIGS. 4-8. In addition to the rotor 102, the rotor assembly 400 includes a collar 402 and a plurality of fasteners 414. The preferred collar 402 is an elongated bar about as thick as the rotor 102 and having a generally C-shape with an exterior curve 420, an interior curve 422, a first face 404, a first end 406 having a first receiving bore 408, and a second end 410 having a second receiving bore 412, The interior curve 422 is about equal to the diameter and angle of curve of the first half 122 of the main aperture 104 whereas the exterior curve 420 is about equal to the diameter and angle of curve of the second half 124 of the main aperture 104. The preferred fasteners 414 are conventional bolts 414a, 414b having a head portion 416a,b and a threaded shaft 418a,b.

The second half 124 of the main aperture 104 and the collar 402 are described in terms of being circular and having "C" shapes for convenience purpose only. It would be readily apparent to one of ordinary skill in the relevant art to use any comparable shape for the main aperture's 104 second half 124 and the collar 402 that accomplishes the same function of securing a rotor 102 to a motor shaft 802. The only requirement is for the interior curve 422 of the collar 402 to match the curve of the first half 122 of the main aperture 104—both of which matching the diameter and curve of the motor shaft 802. For example, the second half 124 of the main aperture 104 and the collar 402 may have any block or polygonal shape.

Optionally, washers 506, 508 may be used with the rotor assembly 400. For example, a first washer 506 may be used under the head portion 416a of the first fastener 414a to enhance the tightening and locking action of the first fastener 414a to the collar 402. Similarly, a second washer 508 may be used under the head portion 416b of the second fastener 414b to enhance the tightening and locking action of the second fastener 414b to the collar 402. The washers 506, 508 may be any conventional washer, such as a flat or locking washer.

The rotor 102 also may have a bevelled outer edge 502 and bevelled inner edge 504. The bevelled outer edge 502 and bevelled inner edge 504 of the rotor 102 may have a small taper to facilitate the positioning of the rotor 102 on a motor shaft. For example, such a taper may be 0.03 wide having a 45 degree angle.

Operationally, the collar 402 is disposed within the second half 124 of the main aperture 104. A first fastener 414a is disposed in the first side aperture 126 with the head portion 416a being contained in the first top portion 106 and the shaft 418a contained in the first bottom portion 108. Similarly, the second fastener 414b is disposed in the second side aperture 128 with the head portion 416b being contained in the second top portion 110 and the shaft 418b contained in the second bottom portion 112. The first fastener 414a is then screwed into the first receiving bore 408 of the pressure clamp 402 while the second fastener 414b is screwed into the second receiving bore 412 of the pressure clamp 402. In this method, both fasteners 414a,b are only lightly secured to the pressure clamp 402 in order to enable the rotor assembly 400 to be installed onto a motor shaft. Therefore, once the components of the rotor assembly 400 are loosely fastened together, the rotor assembly 400 is installed onto a motor shaft 802 with the motor shaft 802 passing through the main aperture 104. Specifically, the motor shaft 802 passes through the hole formed by the first half 122 of the main aperture 104 and the interior curve 422 of the collar 402. Once in the desired position on the motor shaft 802, the first fastener 414a and the second fastener 414b are tightened using a wrench 702 on the head portions 416a,b of the fasteners 414a,b. As the fasteners 414a,b are tightened, the collar 402 is moved and tightened against the motor shaft 802, thereby securing the rotor 102 to the motor shaft 802.

CONCLUSION

While various embodiments of the present invention have been described above, it should be understood that they have been presented by the way of example only, and not limitation. It will be understood by those skilled in the art that various changes in form and details may be made therein without departing from the spirit and scope of the invention as defined. Thus, the breadth and scope of the present invention should not be limited by any of the above-described exemplary embodiments.

I claim:

1. A rotor assembly for mounting a rotor to a motor shaft, comprising:

a rotor having a thickness, a first face, a second face, a main aperture having a first half and a second half, a first side aperture having a first top portion and a first bottom portion with said first top portion being wider than said first bottom portion and said first bottom portion being open to said second half of said main aperture, and a second side aperture having a second top portion and a second bottom portion with said second top portion being wider than said second bottom portion and said second bottom portion being open to said second half of said main aperture, wherein said first half of said main aperture is generally a half circle having a first diameter and said second half of said main aperture is generally a half circle having a second diameter, said first diameter being smaller than said second diameter;

a first fastener adapted to be disposed within said first side aperture;

a second fastener adapted to be disposed within said second side aperture; and a collar having an exterior curve, an interior curve, a first end, and a second end and being adapted to be disposed within said second half of said main aperture, said first end having a means for receiving a first fastener, and said second end having a means for receiving a second fastener.

2. The rotor assembly according to claim 1 wherein said first side aperture and said second side aperture are generally T-shaped.

3. The rotor assembly according to claim 1, wherein said first top portion of said first side aperture passes through said thickness of said rotor extending from said first face to said second face; and said second top portion of said second side aperture passes through said thickness of said rotor extending from said first face to said second face.

4. The rotor assembly according to claim 1, wherein said first bottom portion of said first side aperture is open to said first face of said rotor and has a depth less than said thickness of said rotor, and said second bottom portion of said second side aperture is open to said second face of said rotor and has a depth less than said thickness of said rotor.

5. The rotor assembly according to claim 1, wherein said first diameter of said first half of said main aperture and said interior curve of said collar are about equal to a diameter of the motor shaft.

6. The rotor assembly according to claim 1, wherein said first fastener and said second fastener are selected from a group consisting of: threaded screws, and threaded bolts.

7. The rotor assembly according to claim 6, wherein a head portion of said first fastener is disposed within said first top portion of said first side aperture and a shaft portion of said first fastener is disposed within said first bottom portion of said first side aperture, and a head portion of said second fastener is disposed within said second top portion of said second side aperture and a shaft portion of said second fastener is disposed within said second bottom portion of said second side aperture.

8. The rotor assembly according to claim 7, wherein said first end of said collar has a first threaded bore for receiving said shaft portion of said first fastener, and said second end of said collar has a second threaded bore for receiving said shaft portion of said second fastener.

9. The rotor assembly according to claim 1, wherein said collar is generally C-shape.

10. The rotor assembly according to claim 1, further comprising:

a first washer disposed under a head portion of said first fastener; and a second washer disposed under a head portion of said second fastener.

11. The rotor assembly according to claim 10, wherein said first washer and said second washer are selected from a group consisting of a flat washer and a locking washer.

12. A rotor assembly for mounting a rotor to a motor shaft, comprising:
- a rotor having a thickness, a first face, a second face, a main aperture having a first half and a second half, wherein said first half of said main aperture is generally a half circle having a diameter about equal to a diameter of the motor shaft;
- a collar having an interior curve with a diameter about equal to said first half of said main aperture, said collar being adapted to be disposed within said second half of said main aperture; and
- a means for securing said collar within said second half of said main aperture of said rotor such that said rotor is securely mounted on the motor shaft.

13. The rotor assembly according to claim 12, wherein said collar has an exterior edge with a shape corresponding to a shape of an exterior edge of said second half of said main aperture.

14. The rotor assembly according to claim 12, wherein said means for securing comprises one or more fasteners.

15. A method for securely mounting a rotor to a motor shaft, comprising the steps of:
- (a) selecting a rotor having a thickness, a first face, a second face, a main aperture having a first half and a second half, wherein said first half of said main aperture is generally a half circle having a diameter about equal to a diameter of the motor shaft;
- (b) selecting a collar having an interior curve with a diameter about equal to said first half of said main aperture, said collar being adapted to be disposed within said second half of said main aperture;
- (c) disposing said collar in said second half of said main aperture of said rotor;
- (d) disposing said rotor on the motor shaft such that the motor shaft passes through said first half of said main aperture of said rotor and said interior curve of said collar; and
- (e) tightening said collar to said rotor such that said rotor is securely mounted on the motor shaft.

16. The method according to claim 15, wherein said collar is c-shaped and said second half of said main aperture is half a circle with a diameter greater than said diameter of said first half.

17. The method according to claim 15, wherein said step (e) comprises tightening one or more fasteners connecting said rotor to said collar.

* * * * *